United States Patent
Inoue et al.

(10) Patent No.: US 10,436,127 B2
(45) Date of Patent: Oct. 8, 2019

(54) COMBUSTION-STABILIZING DEVICE AND COMBUSTION-STABILIZING METHOD FOR INTERNAL COMBUSTION ENGINE

(71) Applicant: MITSUBISHI ELECTRIC CORPORATION, Chiyoda-ku (JP)

(72) Inventors: Takahiro Inoue, Chiyoda-ku (JP); Taichiro Tamida, Chiyoda-ku (JP); Takashi Hashimoto, Chiyoda-ku (JP); Noboru Wada, Chiyoda-ku (JP); Akira Nakagawa, Chiyoda-ku (JP); Tomokazu Sakashita, Chiyoda-ku (JP); Tetsuya Honda, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/765,632

(22) PCT Filed: Dec. 3, 2015

(86) PCT No.: PCT/JP2015/084007
§ 371 (c)(1),
(2) Date: Apr. 3, 2018

(87) PCT Pub. No.: WO2017/094164
PCT Pub. Date: Jun. 8, 2017

(65) Prior Publication Data
US 2019/0078520 A1    Mar. 14, 2019

(51) Int. Cl.
*F02D 19/12* (2006.01)
*F02M 25/10* (2006.01)
(Continued)

(52) U.S. Cl.
CPC ......... *F02D 19/12* (2013.01); *F02D 41/0002* (2013.01); *F02D 41/0025* (2013.01);
(Continued)

(58) Field of Classification Search
CPC ......... F02D 2200/0406; F02D 2250/21; F02D 41/0002; F02D 41/0025; F02D 41/045; F02D 41/10; Y02T 10/42
See application file for complete search history.

(56) References Cited

U.S. PATENT DOCUMENTS 4,304,129 A * 12/1981 Kawai .................. F02D 41/187
    73/114.34
4,345,555 A *  8/1982 Oshima .................. F02P 9/002
    123/145 A (Continued)

FOREIGN PATENT DOCUMENTS

JP     6-336941 A    12/1994
JP    2002-276404 A    9/2002
(Continued)

OTHER PUBLICATIONS

International Search Report dated Jan. 12, 2016 in PCT/JP2015/084007, filed on Dec. 3, 2015.

*Primary Examiner* — Audrey K Bradley
*Assistant Examiner* — Anthony Ayala Delgado
(74) *Attorney, Agent, or Firm* — Oblon, McClelland, Maier & Neustadt, L.L.P.

(57) ABSTRACT

A change amount per unit time of an engine output command for controlling engine output of an internal combustion engine is calculated as an engine output increasing rate, and a power supply device is controlled so that power corresponding to the calculated engine output increasing rate is supplied to a combustion promoter generation device. The combustion promoter generation device generates a combustion promoter through the power supplied from the power supply device to supply the combustion promoter to a combustion chamber of the internal combustion engine, and a generation amount of the combustion promoter increases as the supplied power increases. In this manner, (Continued)

the generation amount of the combustion promoter is adjusted.

7 Claims, 12 Drawing Sheets

(51) Int. Cl.
  *F02D 41/00* (2006.01)
  *F02D 41/04* (2006.01)
  *F02D 41/10* (2006.01)

(52) U.S. Cl.
  CPC ............ *F02D 41/045* (2013.01); *F02D 41/10* (2013.01); *F02M 25/10* (2013.01); *F02D 2200/0406* (2013.01); *F02D 2200/0414* (2013.01); *F02D 2200/0418* (2013.01); *F02D 2200/1002* (2013.01); *F02D 2250/21* (2013.01); *Y02T 10/42* (2013.01)

(56) References Cited

U.S. PATENT DOCUMENTS

| | | | | |
|---|---|---|---|---|
| 4,391,132 | A | * | 7/1983 | Egami ................... F02D 41/187 73/114.34 |
| 4,400,974 | A | * | 8/1983 | Nishimura ............ F02D 41/187 73/114.34 |
| 4,425,792 | A | * | 1/1984 | Kohama ................... G01F 1/69 73/204.27 |
| 5,465,700 | A | | 11/1995 | Nishimoto |
| 2016/0153407 | A1 | * | 6/2016 | Ursic ............... F02M 35/10268 123/556 |

FOREIGN PATENT DOCUMENTS

| | | |
|---|---|---|
| JP | 2002-310014 A | 10/2002 |
| JP | 2002-317635 A | 10/2002 |
| JP | 2007-187130 A | 7/2007 |
| JP | 2012-72739 A | 4/2012 |
| JP | 2013-194712 A | 9/2013 |
| JP | 2015-055224 A | 3/2015 |
| JP | 2015-194089 A | 11/2015 |

* cited by examiner

# COMBUSTION-STABILIZING DEVICE AND COMBUSTION-STABILIZING METHOD FOR INTERNAL COMBUSTION ENGINE

TECHNICAL FIELD

The present invention relates to a combustion stabilization device for an internal combustion engine, which is configured to supply a combustion promoter for promoting combustion to a combustion chamber, to thereby stabilize the combustion, and a combustion stabilization method for an internal combustion engine.

BACKGROUND ART

There has been proposed a technology of supplying ozone to a combustion chamber, to thereby stabilize combustion in a related-art internal combustion engine (for example, refer to Patent Literature 1).

CITATION LIST

Patent Literature

[PTL 1] JP 2002-276404 A

SUMMARY OF INVENTION

Technical Problem

In the related-art internal combustion engine, the combustion may transiently become unstable not only when a load is low, but also when the load increases. In the related art described in Patent Literature 1, control is carried out so as to decrease an amount of ozone to be supplied to the combustion chamber when the load of the internal combustion engine increases.

However, this control method has such a problem as inducing further momentary instability of the combustion when the load of the internal combustion engine increases. Moreover, even when a function of detecting a combustion state of the internal combustion engine and adjusting the amount of ozone to be supplied to the combustion chamber in accordance with the detection result is provided, there is such a problem that a response is not fast enough at the time of the transient instability of the combustion.

The present invention has been made in view of the above-mentioned problem, and has an object to provide a combustion stabilization device and a combustion stabilization method for an internal combustion engine, which are capable of suppressing transient instability of combustion caused by an increase in load of an internal combustion engine.

Solution to Problem

According to one embodiment of the present invention, there is provided a combustion stabilization device for an internal combustion engine including: a power supply device, which is configured to supply power; a combustion promoter generation device, which is configured to generate a combustion promoter through the power supplied from the power supply device to supply the combustion promoter to a combustion chamber of an internal combustion engine, a generation amount of the combustion promoter increasing as the supplied power increases; an engine output command device, which is configured to output an engine output command for controlling engine output of the internal combustion engine; and an electronic control unit, which is configured to control the power supply device, in which the electronic control unit includes: an engine output increasing rate calculation section, which is configured to calculate a change amount per unit time of the engine output command output by the engine output command device as an engine output increasing rate; and a power supply control section, which is configured to control the power supply device so that the power corresponding to the engine output increasing rate calculated by the engine output increasing rate calculation section is supplied, to thereby adjust the generation amount of the combustion promoter.

According to one embodiment of the present invention, there is provided a combustion stabilization method for an internal combustion engine, the combustion stabilization method including the step of: calculating a change amount per unit time of an engine output command for controlling engine output of an internal combustion engine as an engine output increasing rate; and adjusting an amount of a combustion promoter to be supplied to a combustion chamber of the internal combustion engine in accordance with the calculated engine output increasing rate, in which the steps are carried out by an electronic control unit.

Advantageous Effects of Invention

According to the present invention, the change amount per unit time of the engine output command for controlling the engine output of the internal combustion engine is calculated as the engine output increasing rate, and the power supply device is controlled so that the power corresponding to the engine output increasing rate is supplied, to thereby adjust the generation amount of the combustion promoter from the combustion promoter generation device. With this configuration, it is possible to provide the combustion stabilization device and the combustion stabilization method for an internal combustion engine, which are capable of suppressing the transient instability of the combustion caused by the increase in the load of the internal combustion engine.

DESCRIPTION OF EMBODIMENTS

Now, a combustion stabilization device and a combustion stabilization method for an internal combustion engine according to exemplary embodiments of the present invention are described referring to the accompanying drawings. In the illustration of the drawings, the same components are denoted by the same reference symbols, and the overlapping description thereof is herein omitted.

First Embodiment

Figure 1:
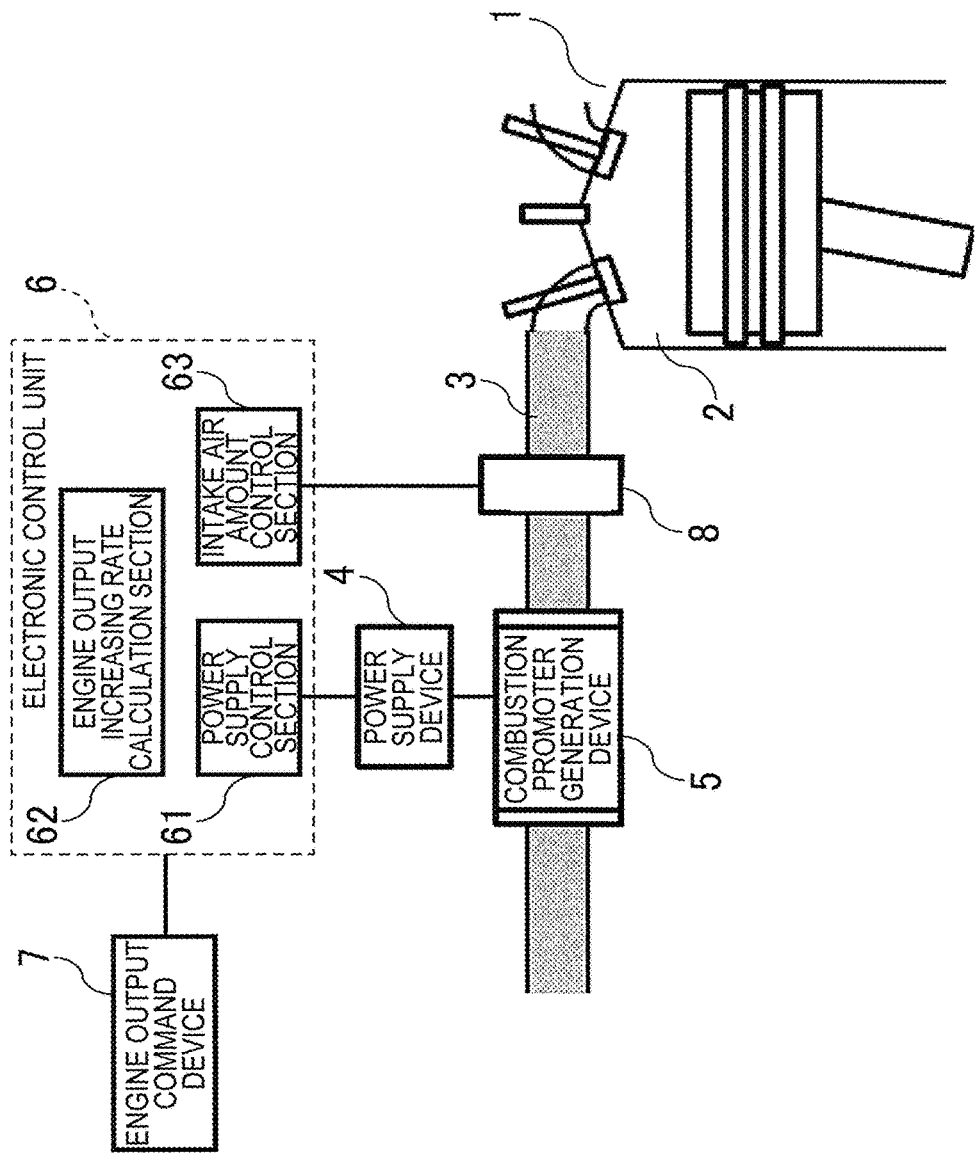
FIG. 1 is a schematic diagram for illustrating an example of a combustion stabilization device for an internal combustion engine according to a first embodiment of the present invention.

FIG. 1 is a schematic diagram for illustrating an example of a combustion stabilization device for an internal combustion engine according to a first embodiment of the present invention. In FIG. 1, an internal combustion engine 1 to which the combustion stabilization device for an internal combustion engine (hereinafter sometimes abbreviated as combustion stabilization device) is applied, a combustion chamber 2 and an intake path 3 of the internal combustion engine 1, and an intake air amount adjustment device 8 provided in the intake path 3 are collectively illustrated.

In the first embodiment, the combustion stabilization device is configured to supply a combustion promoter for promoting combustion to the combustion chamber 2 of the internal combustion engine 1, to thereby stabilize the combustion. Moreover, the combustion promoter is generated through discharge generated by applying an AC voltage between electrodes of a combustion promoter generation device 5 described later.

In FIG. 1, the combustion stabilization device includes a power supply device 4, the combustion promoter generation device 5, an electronic control unit 6, and an engine output command device 7. The electronic control unit 6 includes a power supply control section 61, an engine output increasing rate calculation section 62, and an intake air amount control section 63. The electronic control unit 6 is implemented by a CPU configured to execute a program stored in a memory and a processing circuit, for example, a system LSI.

The power supply device 4 has a function of converting a DC voltage to a higher AC voltage, and supplies power generated in accordance with an electric energy command input from the power supply control section 61 to the combustion promoter generation device 5. Specifically, the power supply device 4 is capable of supplying any power that is equal to or less than the maximum output of the power supply device 4 itself to the combustion promoter generation device 5 in accordance with a control signal input from the power supply control section 61. Moreover, the timing to supply the power from the power supply device 4 to the combustion promoter generation device 5 is also controlled in accordance with a control signal input from the power supply control section 61.

The power supplied by the power supply device 4, namely, the AC voltage, is only required to be capable of generating the discharge when the AC voltage is applied between the electrodes of the combustion promoter generation device 5. Thus, the AC voltage is not limited to a sine wave, and may be a rectangular wave.

Figure 2:
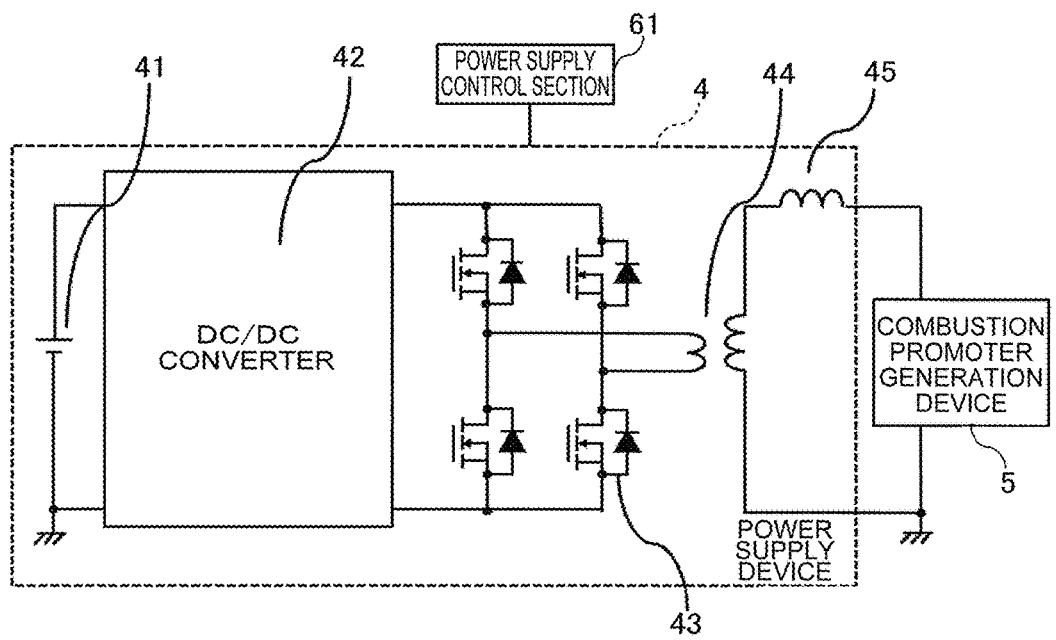
FIG. 2 is a circuit diagram for illustrating an example of a configuration of a power supply device in the first embodiment of the present invention.

Referring to FIG. 2, a description is now given of a specific configuration example of the power supply device 4. FIG. 2 is a circuit diagram for illustrating the example of the configuration of the power supply device 4 in the first embodiment of the present invention.

In FIG. 2, the power supply device 4 includes a DC power supply 41, a DC/DC converter 42, switching devices 43, a step-up transformer 44, and a resonance coil 45.

The DC power supply 41 outputs a DC voltage to the DC/DC converter 42. As the DC power supply 41, for example, a general battery for a motor vehicle capable of applying a DC voltage of 12 V may be used.

The DC/DC converter 42 steps up the DC voltage output by the DC power supply 41 to, for example, a voltage twice or more and 40 times or less as high as the DC voltage, and outputs the DC voltage after being stepped up. The DC voltage after being stepped up is converted to the AC voltage by an inverter formed as a full-bridge circuit, which is constructed of the four switching devices 43 configured as two serial/two parallel connections. The switching devices 43 are switched on/off in accordance with the control signal input from the power supply control section 61. As a result of this switching control, the AC voltage can be generated.

In FIG. 2, the conversion from the DC voltage to the AC voltage is carried out by the full-bridge circuit, but the conversion may be carried out by a half-bridge circuit. When the half-bridge circuit is used, a required number of the switching devices 43 is two. However, the voltage twice as high as the voltage of the full-bridge circuit is applied to the switching devices 43, and hence switching devices 43 having a higher withstand voltage is required to be selected.

Moreover, with a configuration in which the DC voltage of the DC power supply 41 is not stepped up by the DC/DC converter 42 and the DC voltage of the DC power supply 41 is directly converted to the AC voltage by the switching devices 43, the DC/DC converter 42 is not required.

A primary side of the step-up transformer 44 is connected so as to connect between the two serial connections of the four switching devices 43 configured as the two serial/two parallel connections. A high-voltage-side terminal on a secondary side of the step-up transformer 44 is connected to the combustion promoter generation device 5 via the resonance coil 45, whereas a low-voltage-side terminal on the secondary side is grounded. A turn ratio of the step-up transformer 44 is determined within a range of, for example, 2 or more and 20 or less, in accordance with a required step-up ratio. In this way, a high voltage generated by both the step-up through the step-up transformer 44 and step-up through resonance is applied between the electrodes of the combustion promoter generation device 5.

In the first embodiment, the step-up transformer 44 is not necessarily required, and the step-up transformer 44 may not be provided. In this case, the high voltage applied between the electrodes of the combustion promoter generation device 5 is required to be generated not by both the step-up through the step-up transformer 44 and the step-up through the resonance, but only by the step-up through the resonance.

The power supply control section 61 outputs a control signal having a repetition frequency of 1 Hz or higher to the switching devices 43. The power supply device 4 repeats an operation of applying the voltage between the electrodes of the combustion promoter generation device 5 and an operation of not applying the voltage between the electrodes in accordance with the control signal input from the power supply control section 61. Moreover, the power supplied from the power supply device 4 to the combustion promoter generation device 5 can be adjusted through a ratio between a period in which the voltage is applied between the electrodes and a period in which the voltage is not applied. A repetition frequency of the control signal may be synchronized with the rotation of the internal combustion engine 1. In this case, the frequency can be matched with the number of engine revolutions, and the control is thus simplified.

In the period in which the voltage is applied between the electrodes of the combustion promoter generation device 5, it is considered that the power supplied to the combustion promoter generation device 5 per unit time is constant, but actually, the supplied power is not completely constant, and slightly increases or decreases depending on a discharge environment of the combustion promoter generation device 5 and the temperature of the power supply device 4. Thus, a capacitor may be provided on a low voltage side of the combustion promoter generation device 5 to always detect the power by obtaining a Lissajous waveform from the voltage applied between the electrodes and a voltage of the capacitor, and the repetition frequency may be adjusted in accordance with the detection result so that the power is maintained to be constant.

The combustion promoter generation device 5 generates the discharge between the electrodes thereof through the power supplied from the power supply device 4, to thereby generate the combustion promoter, and supplies the combustion promoter to the combustion chamber 2 of the internal combustion engine 1. Moreover, as the power supplied to the combustion promoter generation device 5 increases, the generation amount of the combustion promoter increases.

Figure 3:
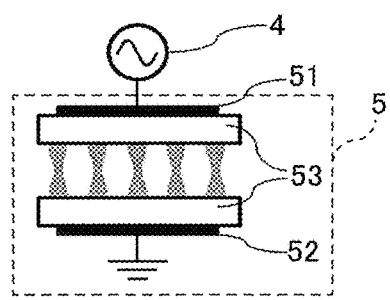
FIG. 3 is a configuration diagram for illustrating an example of a configuration of a combustion promoter generation device in the first embodiment of the present invention.
Figure 4:
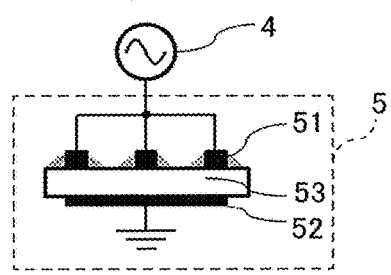
FIG. 4 is a configuration diagram for illustrating another example of the configuration of the combustion promoter generation device in the first embodiment of the present invention.

Referring to FIG. 3 and FIG. 4, a description is now given of a specific configuration example of the combustion promoter generation device 5.

FIG. 3 is a schematic diagram for illustrating an example of the configuration of the combustion promoter generation device 5 in the first embodiment of the present invention. In FIG. 3, the combustion promoter generation device 5 includes a first electrode 51, a second electrode 52, and a dielectric body 53.

The first electrode 51 is provided so as to be opposed to the second electrode 52 across a gap. Moreover, at least one dielectric body 53 is interposed between the first electrode 51 and the second electrode 52.

A high voltage terminal of the power supply device 4 is connected to the first electrode 51, and a low voltage terminal of the power supply device 4 is connected to the second electrode 52. When the voltage is applied between the electrodes from the power supply device 4, dielectric barrier discharge is generated in the gap between the first electrode 51 and the second electrode 52 via the dielectric body 53. When the barrier discharge is generated, the oxygen molecule and the water molecule in the air are decomposed, and at least one of the ozone, the OH radical, or the O radical is generated as the combustion promoter for promoting the combustion.

FIG. 4 is a schematic diagram for illustrating another example of the configuration of the combustion promoter generation device 5 in the first embodiment of the present invention. In FIG. 4, the combustion promoter generation device 5 includes the first electrodes 51, the second electrode 52, and the dielectric body 53.

The first electrodes 51 are provided so as to be opposed to the second electrode 52. Moreover, the dielectric body 53 provided between the first electrodes 51 and the second electrode 52 is in contact with both of the first electrodes 51 and the second electrode 52. With this configuration, discharge along a surface of the dielectric body 53 can be generated, and the combustion promoter can be generated as in the example described above.

When the configuration illustrated in FIG. 3 and the configuration illustrated in FIG. 4 are compared with each other, the configuration illustrated in FIG. 3 has such an advantage that a generation efficiency of the combustion promoter is higher, and the configuration illustrated in FIG. 4 has such an advantage that the applied voltage required to generate the discharge is lower.

The combustion promoter generation device 5 is provided in the intake path 3 of the internal combustion engine 1. When the combustion promoter generation device 5 is provided in the intake path 3, the combustion promoter generation device 5 may be provided on the combustion chamber 2 side or an atmosphere side with respect to the intake air amount adjustment device 8 configured to adjust an intake air amount of the internal combustion engine 1.

When the combustion promoter generation device 5 is provided on the combustion chamber 2 side with respect to the intake air amount adjustment device 8, a distance from a position at which the combustion promoter is generated to the combustion chamber 2 can be shortened, and the combustion promoter immediately after the generation can thus be supplied to the combustion chamber 2. When the distance from the position at which the combustion promoter is generated to the combustion chamber 2 is long, a part of the generated combustion promoter may be decomposed, and the distance is thus required to be appropriately set. Moreover, a period from the generation of the combustion promoter until the supply thereof to the combustion chamber 2 can further be decreased by generating the discharge in the combustion promoter generation device 5 in time with an intake timing of the internal combustion engine 1.

An environment in which the combustion promoter generation device 5 is installed is an environment under a pressure of the atmospheric pressure or less, and thus has such an advantage that the voltage required to generate the discharge is lower. Moreover, pulsation of the pressure due to the air intake can be used to set the discharge timing in the combustion promoter generation device 5.

Meanwhile, when the combustion promoter generation device 5 is provided on the atmosphere side with respect to the intake air amount adjustment device 8, the discharge can be generated in a stable pressure environment. Moreover, even when the power supplied by the power supply device 4 fluctuates due to fluctuation of an ambient pressure at the time of the generation of the discharge in the combustion promoter generation device 5, power can be stably supplied to the combustion promoter generation device 5.

The engine output command device 7 is configured to output an engine output command for controlling engine output of the internal combustion engine 1. The engine output is represented by a product of an engine load and the number of engine revolutions. Thus, an increase in the engine output means an increase in the product of the engine load and the number of engine revolutions. The engine output command output by the engine output command device 7 is input to the engine output increasing rate calculation section 62 and the intake air amount control section 63.

As a specific configuration example of the engine output command device 7, when the internal combustion engine 1 is mounted in a four-wheeled motor vehicle, an accelerator pedal corresponds to the engine output command device 7. Moreover, when the internal combustion engine 1 is mounted in a two-wheeled motor vehicle, a throttle grip corresponds to the engine output command device 7.

The intake air amount control section 63 outputs an intake air amount command for adjusting the intake air amount to the intake air amount adjustment device 8 in accordance with the engine output command output by the engine output command device 7. The intake air amount adjustment device 8 adjusts the intake air amount in accordance with the intake air amount command. Specifically, for example, when the intake air amount adjustment device 8 is constructed of an intake valve, the intake air amount control section 63 outputs an intake air amount command for controlling an opening degree of the intake valve. In this case, the intake air amount adjustment device 8 adjusts the intake air amount by the opening degree of the intake valve being controlled in accordance with the intake air amount command.

In a general motor vehicle, an amount of fuel to be injected into the combustion chamber 2 is determined in accordance with the intake air amount. Thus, when the combustion is stable in the internal combustion engine 1, the engine output increases as the intake air amount increases. In other words, in the first embodiment, the combustion can be stabilized by the combustion stabilization device, and, as a result, the engine output can reliably be increased as the intake air amount increases.

The engine output increasing rate calculation section 62 calculates a change amount per unit time of the engine output command output by the engine output command device 7 as an engine output increasing rate. Specifically, the engine output increasing rate calculation section 62 calculates a time derivative of the engine output command output by the engine output command device 7, and sets the calculation result as the engine output increasing rate. In the first embodiment, the engine output increasing rate calculated by the engine output increasing rate calculation section 62 is assumed to be a value of 0 or more.

In general, in the internal combustion engine 1, substantial transient instability of the combustion occurs at the time of an increase in the engine output, and the combustion is more liable to become unstable as the engine output increases faster. Thus, the intake air amount control section 63 controls the intake air amount adjustment device 8 so that the intake air amount increases more slowly over time.

The instability of the combustion means an increase in engine output fluctuation in each combustion cycle of the internal combustion engine 1. Moreover, when the instability of the combustion continues, an engine operation may stop. When the internal combustion engine 1 is of the compression self-ignition type, continuous operation is carried out while heat of exhaust gas is carried over to the next cycle by a large amount of exhaust gas recirculation, and slower adjustment is thus required at the time of the increase in the engine output. However, an increase in a period from the output of the engine output command by the engine output command device 7 to an actual increase in the engine output leads to a decrease in responsiveness, and is thus not preferred in terms of practicality.

Thus, at the time of the increase in the engine output, control in consideration of balance between both of the instability of the combustion and the decrease in the responsiveness, which have a trade-off relationship, is performed. In other words, in the first embodiment, the combustion stabilization device can improve the transient instability of the combustion at the time of the increase in the engine output, and can stabilize the combustion at the time of a faster increase in the engine output.

Figure 5:
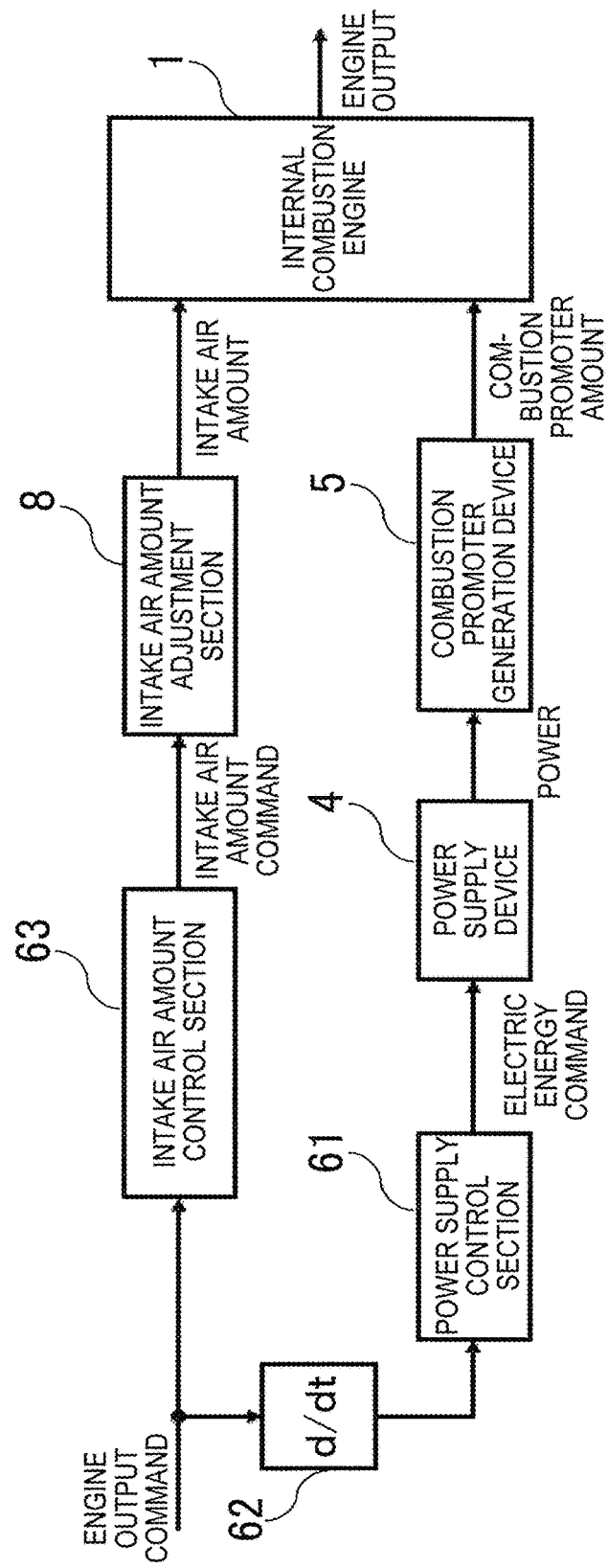
FIG. 5 is a block diagram for illustrating an example of the combustion stabilization device for an internal combustion engine according to the first embodiment of the present invention.

Referring to FIG. 5, a further description is now given of a control operation of the combustion stabilization device. FIG. 5 is a block diagram for illustrating an example of the combustion stabilization device for an internal combustion engine according to the first embodiment of the present invention.

In FIG. 5, the engine output command output by the engine output command device 7 is input to the engine output increasing rate calculation section 62 and the intake air amount control section 63. The intake air amount control section 63 outputs the intake air amount command to the intake air amount adjustment device 8 in accordance with the input engine output command. The intake air amount adjustment device 8 adjusts the intake air amount in accordance with the intake air amount command.

The engine output increasing rate calculation section 62 calculates the engine output increasing rate from the input engine output command, and outputs the engine output increasing rate to the power supply control section 61.

The power supply control section 61 determines, in accordance with the engine output increasing rate input from the engine output increasing rate calculation section 62, the power to be supplied to the combustion promoter generation device 5 corresponding to the engine output increasing rate. The power supply control section 61 determines the supplied power so that the supplied power increases as the input engine output increasing rate increases.

Specifically, for example, a map that is associated with the engine output increasing rate and the supplied power, and is defined so that the supplied power increases as the engine output increasing rate increases is stored in the memory in advance. The power supply control section 61 determines the supplied power corresponding to the engine output increasing rate input from the engine output increasing rate calculation section 62 in accordance with the map stored in the memory.

The power supply control section 61 controls the power supply device 4 so that the determined power is supplied to the combustion promoter generation device 5. As a result, the combustion promoter in an amount corresponding to the power supplied to the combustion promoter generation device 5 can be generated. Moreover, as the power supplied to the combustion promoter generation device 5 increases, the generation amount of the combustion promoter increases.

In this way, the power supply control section 61 controls the power supply device 4 so that the power corresponding to the engine output increasing rate calculated by the engine output increasing rate calculation section 62 is supplied, to thereby adjust the generation amount of the combustion promoter.

It is also conceivable to carry out such feedback control of detecting a combustion state of the internal combustion engine 1 and generating the combustion promoter when combustion stability obtained as a result of the detection result is low. However, the combustion promoter generation device 5 is provided in the intake path 3, and a delay thus occurs in the period from the generation of the combustion promoter until the supply thereof to the combustion chamber 2. Therefore, in such feedback control, the response is not fast enough for the transient instability of the combustion, which is caused by the engine output. In contrast, in the first embodiment, at the time of the increase in the engine output, the combustion promoter is generated from the combustion promoter generation device 5 before the occurrence of the instability of the combustion, and the combustion promoter can thus be supplied simultaneously with the occurrence of the instability of the combustion.

Referring to FIG. 6 to FIG. 10, a description is now given of an operation example of the combustion stabilization device. The power supply control section 61 is configured to use at least one of a plurality of control patterns illustrated in FIG. 6 to FIG. 10 to control the power to be supplied to the combustion promoter generation device 5.

Figure 6:
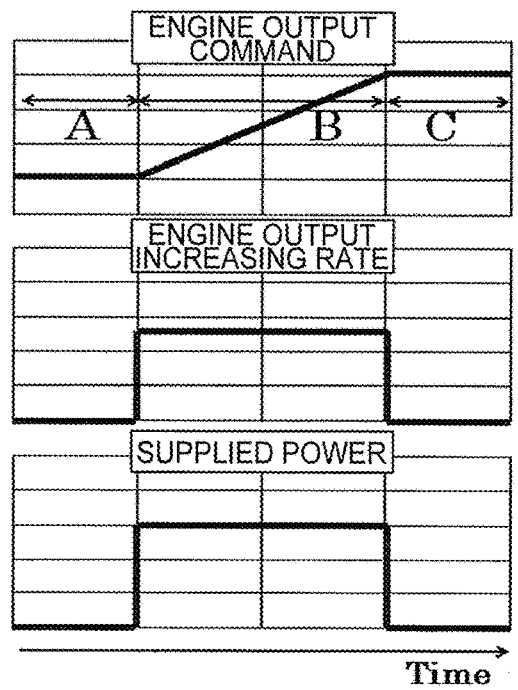
FIG. 6 is a timing chart for illustrating a first example of a relationship among an engine output command, an engine output increasing rate, and supplied power in the first embodiment of the present invention.

FIG. 6 is a timing chart for illustrating a first example of a relationship among the engine output command, the engine output increasing rate, and the supplied power in the first embodiment of the present invention.

In FIG. 6, the respective vertical axes indicate a relative value of the engine output command output by the engine output command device 7, a relative value of the engine output increasing rate calculated by the engine output increasing rate calculation section 62, and a relative value of the power supplied by the power supply device 4, and the horizontal axes are each a common time axis.

Moreover, in FIG. 6, with respect to the horizontal axis, a period can be divided into a period A in which the engine output command is constant, a period B in which the engine output command changes so as to increase, and a period C in which the engine output command becomes constant again. A timing at which the engine output actually increases in accordance with the engine output command and the combustion becomes unstable is later in the future than the illustrated period C.

In FIG. 6, in the period A, the engine output command is constant. Thus, the engine output increasing rate is 0, and the power supplied to the combustion promoter generation device 5 is also 0. When the power supplied to the combustion promoter generation device 5 is 0, the generation amount of the combustion promoter is 0.

Then, in the period B, the engine output command linearly increases, and the engine output increasing rate and the supplied power thus take constant values, which are not 0. As can be understood from FIG. 6, the period B is a period in which the engine output command changes so as to increase and the engine output increasing rate becomes constant.

Then, in the period C, the engine output command becomes constant again. Thus, as in the period A, the engine output increasing rate is 0, and the power supplied to the combustion promoter generation device 5 is also 0. When the power supplied to the combustion promoter generation device 5 is 0, the generation amount of the combustion promoter is 0.

In this way, in the period B, namely, the period in which the engine output command changes so as to increase and the engine output increasing rate is constant, the power supply control section 61 controls the power supply device so that the supplied power is constant, to thereby maintain the generation amount of the combustion promoter to be constant.

A period in which the engine output actually increases is often longer than the period B. Thus, the power may be continuously supplied for a certain period from a transition time point of the transition from the period B to the period C.

Moreover, when the instability of the combustion is gradually improved after the increase in the engine output, the supplied power may not be instantaneously decreased to 0 at the transition time point of the transition from the period B to the period C, but instead, the power may be continuously supplied while being gradually decreased from the transition time point over a certain period. In this case, the supplied voltage is not necessarily required to be completely decreased too, and, depending on an operation state of the internal combustion engine 1, slight power may be continuously supplied after the supplied power has been decreased. With this configuration, the combustion can be more stabilized.

Moreover, for a certain period from the transition time point of the transition from the period B to the period C, the power at the transition time point, namely, the power in the period B, may be continuously supplied, and the supplied power may be decreased to 0 after the combustion is completely stabilized. With this configuration, a sufficient amount of the combustion promoter can be supplied until the combustion is stabilized.

When the power is continuously supplied for a certain period from the transition time point of the transition from the period B to the period C, a supply period from the transition time point, in which the power is continuously supplied, is only required to be set in advance in consideration of characteristics and operation conditions of the internal combustion engine 1. Moreover, in this case, the value of the supplied power in the period C is only required to be set in advance so as to be equal to or less than the supplied power in the period B.

The engine output increasing rate is represented by the time derivative of the engine output command. Specifically, the engine output increasing rate is calculated by obtaining a difference between stepwise values discretized in accordance with a temporal resolution of the engine output increasing rate calculation section 62. In other words, a difference between a current engine output command and a past engine output command one step before is calculated, and a value obtained by dividing the difference by the temporal resolution is set as the time derivative of the engine output command.

When the temporal resolution of the engine output increasing rate calculation section 62 is sufficiently high, a simple backward difference does not cause a problem in most cases, and a load imposed by the calculation of the engine output increasing rate can thus be decreased.

Meanwhile, when the temporal resolution of the engine output increasing rate calculation section 62 is not sufficiently high, a differential calculus of a higher order is required. In this case, the time derivative of the engine output command is calculated through use of the current engine output command and a past engine output command two or more steps before. An engine output command of how many steps before is used, namely, calculation of which order is carried out, is a matter of trade-off between a calculation precision and the calculation load, and is thus only required to be determined in consideration of the temporal resolution of the engine output increasing rate calculation section 62, a memory capacity, and a calculation speed.

Figure 7:
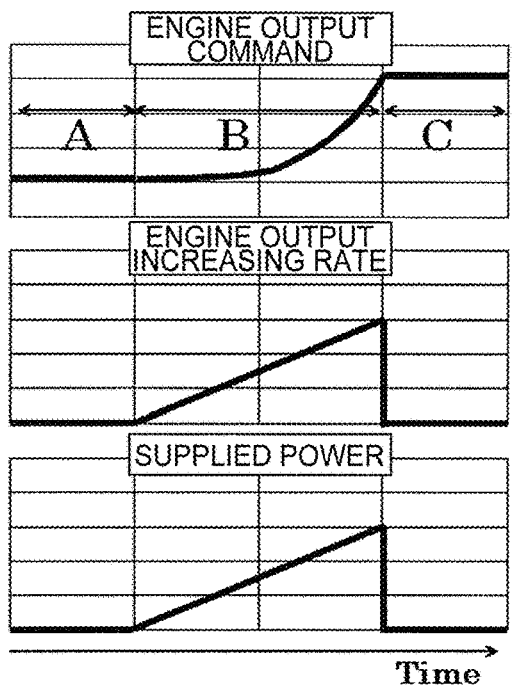
FIG. 7 is a timing chart for illustrating a second example of the relationship among the engine output command, the engine output increasing rate, and the supplied power in the first embodiment of the present invention.

FIG. 7 is a timing chart for illustrating a second example of the relationship among the engine output command, the engine output increasing rate, and the supplied power in the first embodiment of the present invention. The vertical axes and the horizontal axes of FIG. 7 are the same as those of FIG. 6 described above.

Moreover, in FIG. 7, as in FIG. 6 described above, with respect to the horizontal axis, a period can be divided into a period A in which the engine output command is constant, a period B in which the engine output command changes so as to increase, and a period C in which the engine output command becomes constant again.

In FIG. 7, in the period A, the engine output command is constant. Thus, the engine output increasing rate is 0, and the power supplied to the combustion promoter generation device 5 is also 0.

Then, in the period B, the engine output command increases along a downward-convex curve, and the engine output increasing rate linearly increases. Therefore, as the engine output increasing rate increases, the supplied power also linearly increases. As can be understood from FIG. 7, the period B is a period in which the engine output command changes so as to increase and the engine output increasing rate also changes so as to increase.

Then, in the period C, the engine output command becomes constant again. Thus, as in the period A, the engine output increasing rate is 0, and the power supplied to the combustion promoter generation device 5 is also 0.

In this way, in the period B, namely, the period in which the engine output command changes so as to increase and the engine output increasing rate also changes so as to increase, the power supply control section 61 controls the power supply device 4 so that the supplied power changes so as to increase, to thereby increase the generation amount of the combustion promoter.

In FIG. 7, the case in which the supplied power is controlled so as to linearly increase as the engine output increasing rate increases in the period B is exemplified. However, the supplied power may be increased in any manner as long as the supplied power changes so as to increase. Moreover, the engine output increasing rate and the supplied power are not necessarily required to have a proportional relationship. For example, for each of the relative values of the engine output increasing rate and the supplied power, in a case where the supplied power is 10 when the engine output increasing rate is 1, the supplied power may be 15 instead of 20 when the engine output increasing rate is 2.

Moreover, in FIG. 7, the case in which the supplied power becomes 0 at the transition time point of the transition from the period B to the period C is exemplified, but, as described above, the power may be continuously supplied for a certain period from the transition time point.

Figure 8:
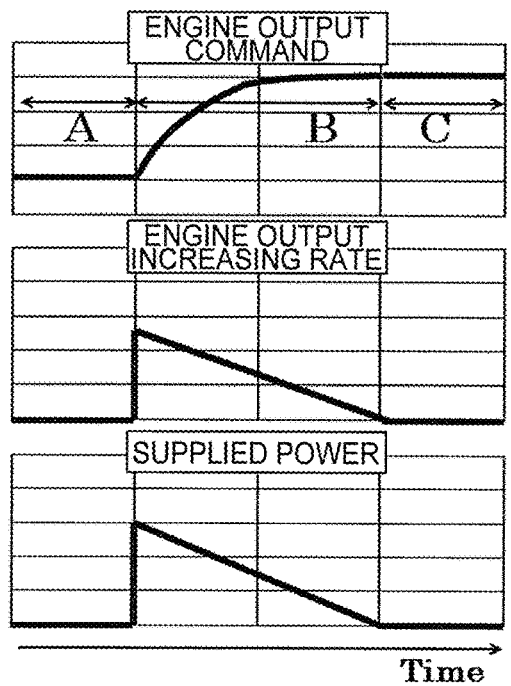
FIG. 8 is a timing chart for illustrating a third example of the relationship among the engine output command, the engine output increasing rate, and the supplied power in the first embodiment of the present invention.

FIG. 8 is a timing chart for illustrating a third example of the relationship among the engine output command, the engine output increasing rate, and the supplied power in the first embodiment of the present invention. The vertical axes and the horizontal axes of FIG. 8 are the same as those of FIG. 6 described above.

Moreover, in FIG. 8, as in FIG. 6 described above, with respect to the horizontal axis, a period can be divided into a period A in which the engine output command is constant, a period B in which the engine output command changes so as to increase, and a period C in which the engine output command becomes constant again.

In FIG. 8, in the period A, the engine output command is constant. Thus, the engine output increasing rate is 0, and the power supplied to the combustion promoter generation device 5 is also 0.

Then, in the period B, the engine output command increases along an upward-convex curve, and the engine output decrease rate linearly decreases. Therefore, as the engine output increasing rate decreases, the supplied power also linearly decreases. As can be understood from FIG. 8, the period B is a period in which the engine output command changes so as to increase, and the engine output increasing rate changes so as to decrease.

Then, in the period C, the engine output command becomes constant again. Thus, as in the period A, the engine output increasing rate is 0, and the power supplied to the combustion promoter generation device 5 is also 0.

In this way, in the period B, namely, the period in which the engine output command changes so as to increase and the engine output increasing rate changes so as to decrease, the power supply control section 61 controls the power supply device 4 so that the supplied power changes so as to decrease, to thereby decrease the generation amount of the combustion promoter.

In FIG. 8, the case in which the supplied power is controlled so as to linearly decrease as the engine output increasing rate decreases in the period B is exemplified.

However, the supplied power may be decreased in any manner as long as the supplied power changes so as to decrease.

Figure 9:
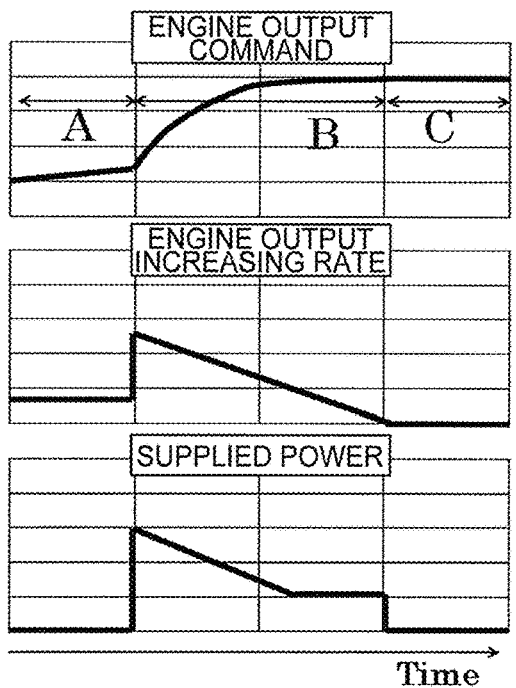
FIG. 9 is a timing chart for illustrating a fourth example of the relationship among the engine output command, the engine output increasing rate, and the supplied power in the first embodiment of the present invention.

FIG. 9 is a timing chart for illustrating a fourth example of the relationship among the engine output command, the engine output increasing rate, and the supplied power in the first embodiment of the present invention. The vertical axes and the horizontal axes of FIG. 9 are the same as those of FIG. 6 described above.

Moreover, in FIG. 9, with respect to the horizontal axis, a period can be divided into a period A in which the engine output command changes so as to increase, a period B in which the engine output command changes so as to increase, and a period C in which the engine output command is constant.

In FIG. 9, in the period A, the engine output command linearly increases, and the engine output increasing rate is constant. In this case, the power supply control section 61 compares the engine output increasing rate and a threshold value set in advance with each other, and determines the supplied power based on the comparison result. Specifically, when the engine output increasing rate is equal to or less than the threshold value, the power supply control section 61 sets the supplied power to 0, and when the engine output increasing rate is larger than the threshold value, the power supply control section 61 supplies supplied power corresponding to the engine output increasing rate.

With this configuration, when the engine output slowly increases, which does not cause significant instability of the combustion, it is possible to prevent wasteful consumption of the power, for example. In FIG. 9, the case in which the engine output increasing rate is equal to or less than the threshold value in the period A is exemplified. Moreover, the threshold value is only required to be set in advance in consideration of the characteristics and the operation conditions of the internal combustion engine 1.

Then, in the period B, the engine output command increases along an upward-convex curve, and the engine output increasing rate linearly decreases. In this case, while the supplied power linearly decreases as the engine output increasing rate decreases, when the supplied power reaches a lower limit value, which is set in advance to a value of more than 0, the supplied power maintains the lower limit value. As can be understood from FIG. 9, the period B is a period in which the engine output command changes so as to increase and the engine output increasing rate changes so as to decrease.

With this configuration, as in the case described above, the power can continuously be supplied for a certain period after the transition time point of the transition from the period B to the period C. In FIG. 9, a case in which the supplied power is decreased from the lower limit value to 0 at the transition time point is exemplified.

Then, in the period C, the engine output command is constant. Thus, the engine output increasing rate is 0, and the power supplied to the combustion promoter generation device 5 is also 0.

In this way, in the period B, namely, the period in which the engine output command changes so as to increase and the engine output increasing rate changes so as to decrease, the power supply control section 61 controls the power supply device 4 so that the supplied power at the lower limit value is supplied after the time point at which the supplied power reaches the lower limit value.

Figure 10:
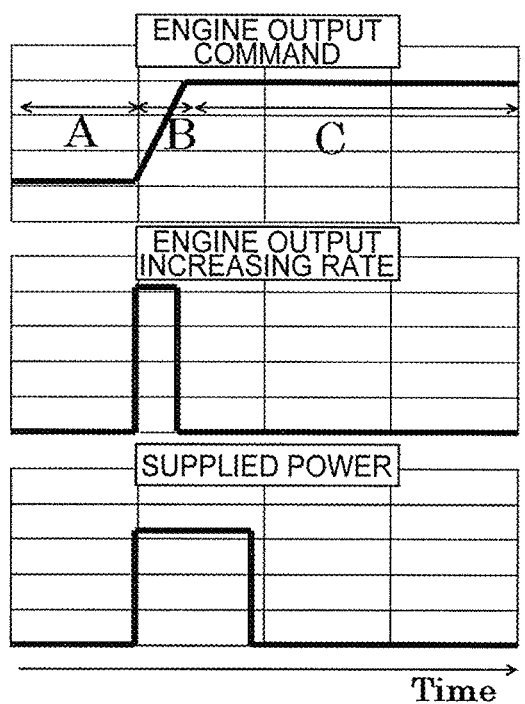
FIG. 10 is a timing chart for illustrating a fifth example of the relationship among the engine output command, the engine output increasing rate, and the supplied power in the first embodiment of the present invention.

FIG. 10 is a timing chart for illustrating a fifth example of the relationship among the engine output command, the engine output increasing rate, and the supplied power in the first embodiment of the present invention. The vertical axes and the horizontal axes of FIG. 10 are the same as those of FIG. 6 described above.

Moreover, in FIG. 10, as in FIG. 6 described above, with respect to the horizontal axis, a period can be divided into a period A in which the engine output command is constant, a period B in which the engine output command changes so as to increase, and a period C in which the engine output command becomes constant again.

In FIG. 10, in the period A, the engine output command is constant. Thus, the engine output increasing rate is 0, and the power supplied to the combustion promoter generation device 5 is also 0.

Then, in the period B, the engine output command linearly increases, and the engine output increasing rate and the supplied power thus take constant values, which are not 0. As can be understood from FIG. 10, the period B is a period in which the engine output command changes so as to increase and the engine output increasing rate becomes constant.

Then, in the period C, the engine output command becomes constant again. Thus, the engine output increasing rate is 0, and the power supplied to the combustion promoter generation device 5 is also 0. As the length of the period B decreases, the power is required to be supplied more momentarily, and when the maximum output of the power supply device 4 is limited, the required supplied power cannot be secured. Thus, in the period C, the supplied power is controlled so as to continuously be supplied for a certain period from the transition time point of the transition from the period B to the period C.

With this configuration, even when the maximum output of the power supply device 4 is limited, the supply period of the supplied power can be extended. As a result, the required supplied power can be secured.

In this way, the power supply control device 61 controls the power supply device 4 so that the power is continuously supplied for the certain period from the transition time point of the transition from the period B, namely, the period in which the engine output command changes so as to increase and the engine output increasing rate is constant, to the period in which the engine output command is constant.

As described above, according to the first embodiment, the change amount of the engine output command per unit time for controlling the engine output of the internal combustion engine is calculated as the engine output increasing rate, and the power supply device is controlled so that the power corresponding to the engine output increasing rate is supplied, to thereby adjust the generation amount of the combustion promoter from the combustion promoter generation device.

In this way, the generation amount of the combustion promoter is adjusted by controlling the power supplied to the combustion promoter generation device in accordance with the engine output command and the engine output increasing rate. Thus, the supply of the combustion promoter to the combustion chamber can be made highly responsive, and the transient instability of the combustion caused by the increase in the load of the internal combustion engine can be suppressed.

Second Embodiment

In a second embodiment of the present invention, a description is given of a case in which a function of providing control of correcting the supplied power corresponding to the engine output increasing rate and supplying the power after being corrected to the combustion promoter generation device 5 is added to the configuration of the above-mentioned first embodiment. In the second embodiment, a description is omitted for the same points as those of the above-mentioned first embodiment, and a description is mainly given of differences from the above-mentioned first embodiment.

The above-mentioned first embodiment is configured so as to control the supplied power in accordance with the increase in the engine output command, but does not consider such possibility that the amount of the combustion promoter generated in accordance with the supplied power may change depending on respective states of the combustion promoter generation device 5 and the internal combustion engine 1. Specifically, for example, depending on the temperature of the combustion promoter generation device 5 and intake air state quantities of the internal combustion engine 1, even when equivalent power is supplied to the combustion promoter generation device 5, the generation amount of the combustion promoter may change.

Moreover, in a strict sense, not only the generation amount of the combustion promoter but also the density of the combustion promoter affects the improvement of the instability of the combustion. Thus, the intake air amount itself corresponding to the number of engine revolutions and the engine load of the internal combustion engine 1 is required to be recognized. Therefore, even when the power corresponding to the engine output increasing rate is supplied to the combustion promoter generation device 5, the density of the combustion promoter may be insufficient depending on the conditions, and the instability of the combustion may not sufficiently be improved.

Thus, in the second embodiment, as an example of means for solving the above-mentioned problem, the supplied power corresponding to the engine output increasing rate is corrected in accordance with the respective states of the combustion promoter generation device 5 and the internal combustion engine 1, and the power after being corrected is supplied to the combustion promoter generation device 5.

Figure 11:
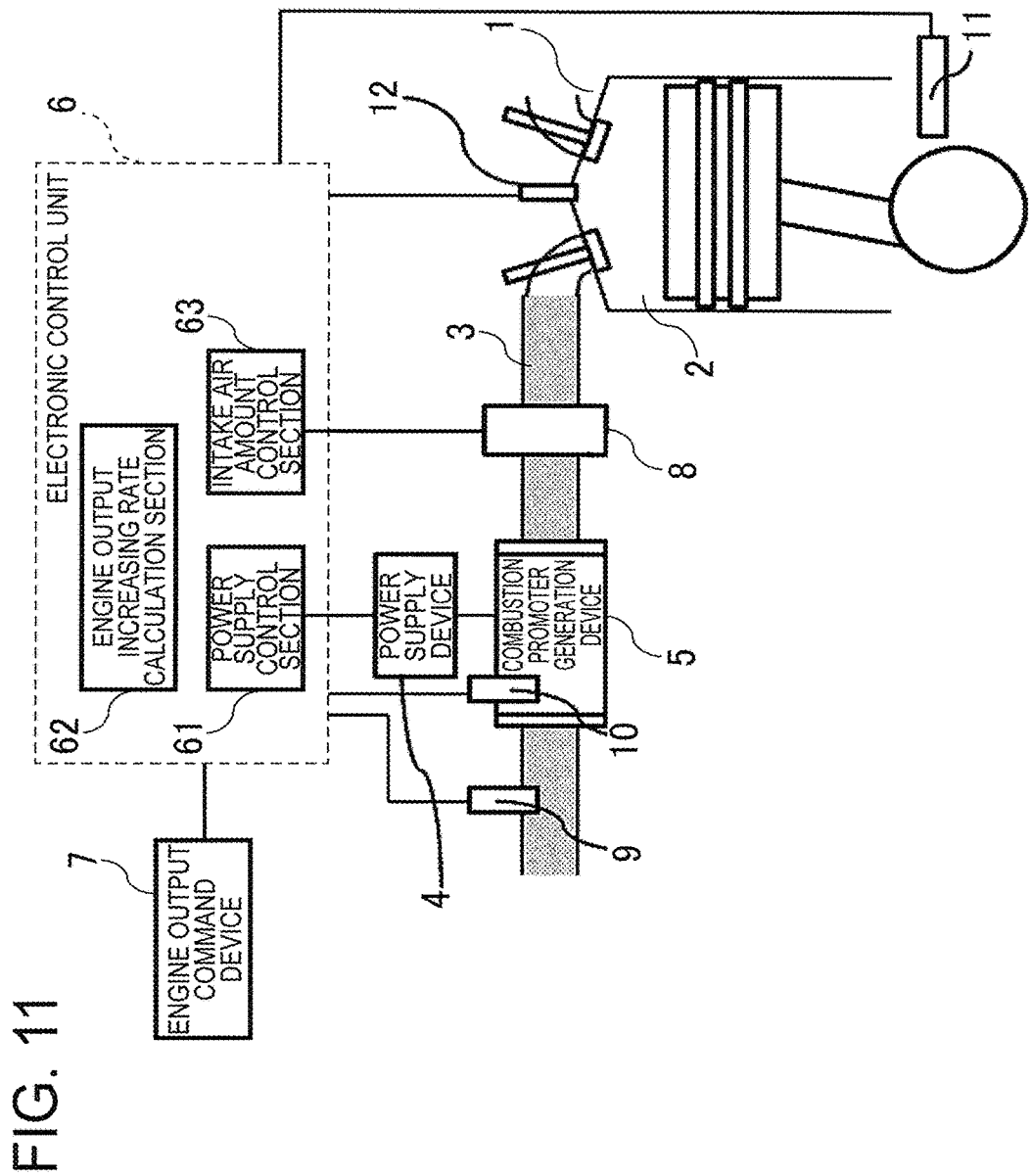
FIG. 11 is a schematic diagram for illustrating an example of a combustion stabilization device for an internal combustion engine according to a second embodiment of the present invention.

FIG. 11 is a schematic diagram for illustrating an example of the combustion stabilization device for an internal combustion engine according to the second embodiment of the present invention. In FIG. 11, the combustion stabilization device further includes an intake air state quantity detection device 9, a generation-device-temperature detection device 10, an engine revolution number detection device 11, and an engine load detection device 12 in addition to the components of FIG. 1 described above.

The intake air state quantity detection device 9 detects intake air state quantities, which are each a state quantity of the intake air of the internal combustion engine 1. Specifically, the intake air state quantity detection device 9 detects at least one of an intake air temperature, which is the temperature of the intake air, an intake air humidity, which is the humidity of the intake air, or an intake air pressure, which is the pressure of the intake air, as the state quantity.

A detection position of the intake air state quantity detection device 9 is preferably on an upstream side of the combustion promoter generation device 5. When it is difficult to set the detection position to the upstream side of the combustion promoter generation device 5 in terms of the configuration, the detection position may be set to a downstream side of the combustion promoter generation device 5. Moreover, the intake air state quantity detection device 9 may be configured to detect the atmosphere before being sucked into the internal combustion engine 1, to thereby correct the atmosphere in consideration of a pressure loss and heat generation by the discharge of the combustion promoter generation device 5 so as to detect the intake air state quantity.

The detection position of the intake air state quantity detection device 9 may be changed depending on the quantity to be detected as the intake air state quantity. Moreover, the intake air state quantity detection device 9 may be configured to detect the intake air state quantity by acquiring values from sensors mounted in the internal combustion engine 1 for use.

When the intake air temperature is included in the quantities to be detected as the intake air state quantities, the intake air state quantity detection device 9 is constructed of a temperature detection device, for example, a thermocouple or a thermistor. When an intake air temperature sensor is mounted in the internal combustion engine 1, the above-mentioned temperature detection device is not required to be independently used as the intake air state quantity detection device 9, and the intake air state quantity detection device 9 is constructed of this intake air temperature sensor. Moreover, when a detection device configured to detect the temperature of the intake air temperature atmosphere is provided, the intake air state quantity detection device 9 may estimate the intake air temperature from a detection value of this detection device.

When the intake air humidity is included in the quantities to be detected as the intake air state quantities, the intake air state quantity detection device 9 is constructed of a detection device, for example, a thermistor, a psychrometer, or a mechanical hygrometer.

When the intake air pressure is included in the quantities to be detected as the intake air state quantities, a method of detecting the intake air pressure changes depending on the position of the combustion promoter generation device 5. When the combustion promoter generation device 5 is provided on the atmosphere side with respect to the intake air amount adjustment device 8, the intake air state quantity detection device 9 considers that the atmospheric pressure and the intake air pressure are equal to each other in the intake path 3 from the atmosphere side to the intake air amount adjustment device 8, and sets the atmospheric pressure as the intake air pressure.

Meanwhile, when the combustion promoter generation device 5 is provided on the combustion chamber 2 side with respect to the intake air amount adjustment device 8, the intake air state quantity detection device 9 detects the intake air pressure. When an intake air pressure sensor is mounted in the internal combustion engine 1, the intake air state quantity detection device 9 is constructed of this intake air pressure sensor.

The generation-device-temperature detection device 10 detects a generation device temperature, which is the temperature of the combustion promoter generation device 5. The generation-device-temperature detection device 10 is constructed of a temperature detection device of a contact type, for example, a thermocouple or a thermistor. The detection position of the generation-device-temperature detection device 10 is the dielectric body 53 or the second electrode 52 of the combustion promoter generation device 5. However, the device temperature is detected while the discharge is being generated in the combustion promoter generation device 5, and thus, irrespective of whether the detection position is the dielectric body 53 or the second electrode 52, the detection position is set to a position on the low voltage side at which influence of electrical noise caused by the discharge is low.

The generation-device-temperature detection device 10 may be configured to detect the generation device temperature through detection of a distortion amount of the dielectric body 53 or detect the generation device temperature from a waveform of voltage applied by the power supply device 4. With this configuration, the cost can be decreased.

Moreover, the generation-device-temperature detection device 10 may be constructed not of the temperature detection device of the contact type, but of a temperature detection device of a non-contact type, for example, a radiation thermometer. With this configuration, compared with the case in which the temperature detection device of the contact type is used, the generation-device-temperature detection device 10 is less likely to be influenced by the electric noise due to the discharge, and a degree of freedom of the installation position thereof thus increases.

The engine revolution number detection device 11 detects the number of engine revolutions of the internal combustion engine 1. As an example, the engine revolution number detection device 11 is configured to detect the number of engine revolutions from a detection value of a crank angle sensor configured to detect a crank angle.

The engine load detection device 12 detects the engine load of the internal combustion engine 1. The engine load detection device 12 is configured to use a net indicated mean effective pressure corresponding to a detection value of a pressure sensor configured to detect a pressure inside the combustion chamber 2 to detect the engine load. Moreover, the engine load detection device 12 may be configured to estimate the engine load from the engine output command and the number of engine revolutions. With this configuration, responsiveness of the detection of the engine load increases.

In a general internal combustion engine, the intake air amount and the engine load are similar indicators. However, in the second embodiment, the stable combustion is not assumed, and hence the engine load does not necessarily increase as the intake air amount increases, and meanings of both of the indicators are distinguished from each other.

Figure 12:
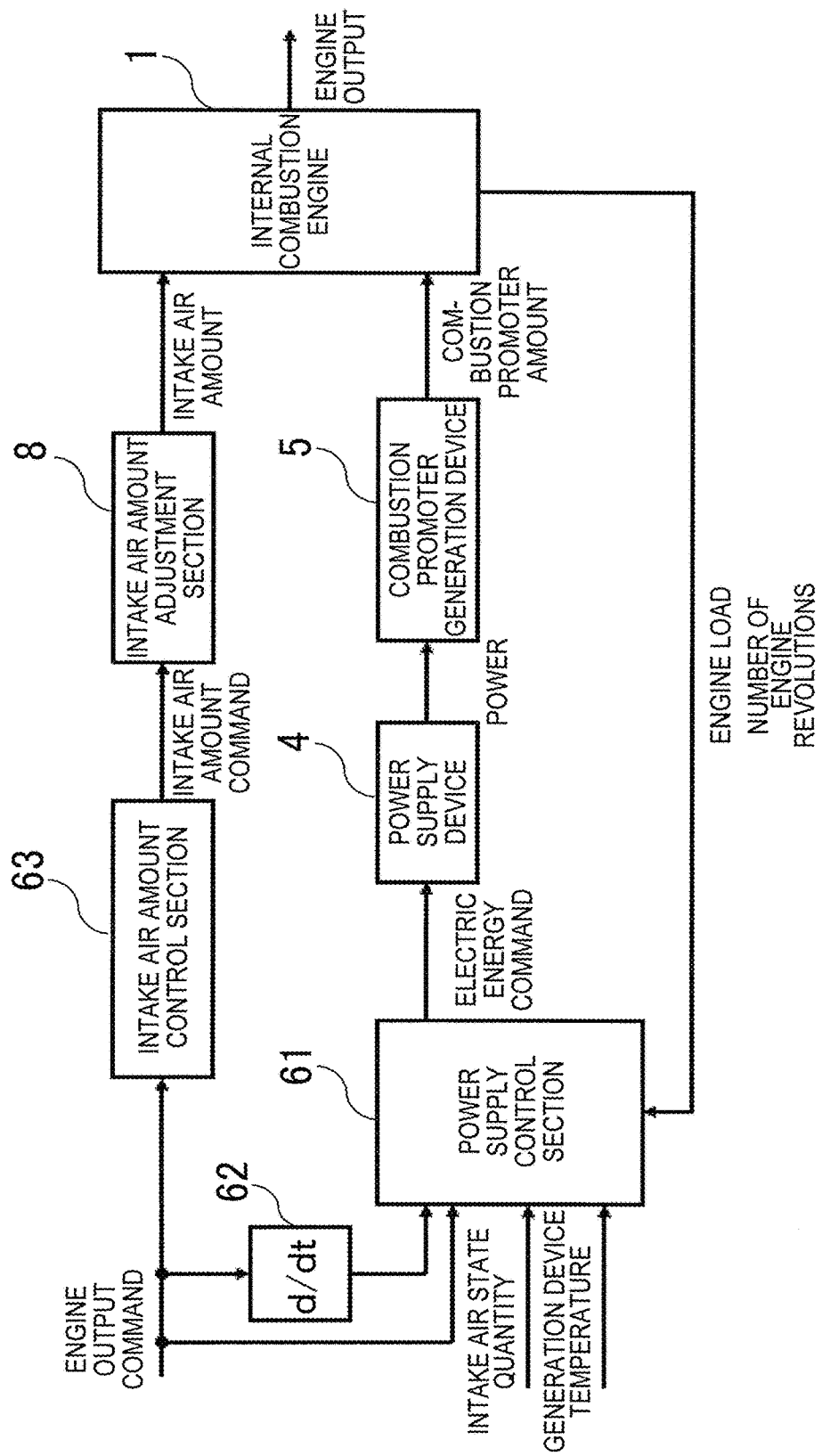
FIG. 12 is a block diagram for illustrating an example of the combustion stabilization device for an internal combustion engine according to the second embodiment of the present invention.

Referring to FIG. 12, a further description is now given of a control operation of the combustion stabilization device. FIG. 12 is a block diagram for illustrating an example of the combustion stabilization device for an internal combustion engine according to the second embodiment of the present invention.

With the configuration of FIG. 5 described above, the power supply control section 61 controls the power to be supplied to the combustion promoter generation device 5 in accordance with the output of the engine output increasing rate calculation section 62. In other words, control is carried out so that the power corresponding to the engine output increasing rate is supplied to the combustion promoter generation device 5.

In contrast, with the configuration of FIG. 12, the power supply control section 61 controls the power to be supplied to the combustion promoter generation device 5 further from the respective outputs of the intake air state quantity detection device 9, the generation-device-temperature detection device 10, the engine revolution number detection device 11, and the engine load detection device 12 in addition to the output of the engine output increasing rate calculation section 62. In other words, control is carried out so that the supplied power corresponding to the engine output increasing rate is corrected in accordance with the respective outputs, and the power after being corrected is supplied to the combustion promoter generation device 5.

Figure 13:
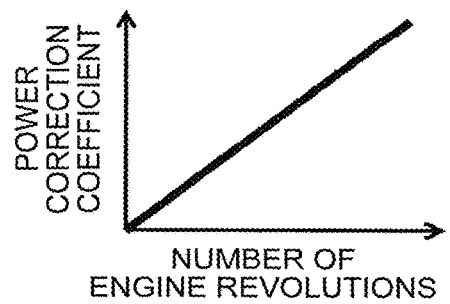
FIG. 13 is a schematic diagram for illustrating an example of a map associating a number of engine revolutions and a power correction coefficient with each other in the second embodiment of the present invention.

Referring to FIG. 13 to FIG. 18, a description is now given of an operation example of the combustion stabilization device. FIG. 13 is a schematic diagram for illustrating an example of a map associating the number of engine revolutions and a power correction coefficient with each other in the second embodiment of the present invention. The map illustrated in FIG. 13 is stored in the memory in advance.

The intake air amount is substantially in a proportional relationship with the number of engine revolutions, and the density of the combustion promoter thus decreases in an inversely proportional manner with respect to the increase in the number of engine revolutions. Thus, the map illustrated in FIG. 13 is set so that the power correction coefficient increases in a proportional manner with respect to the increase in the number of engine revolutions.

The power supply control section 61 calculates the power correction coefficient corresponding to the number of engine revolutions detected by the engine revolution number detection device 11 in accordance with the map illustrated in FIG. 13.

Figure 14:
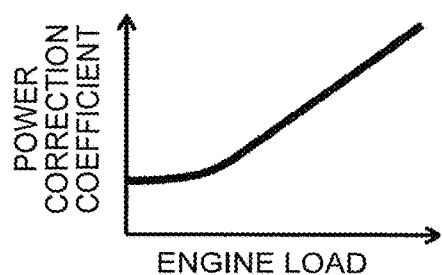
FIG. 14 is a schematic diagram for illustrating an example of a map associating an engine load and a power correction coefficient with each other in the second embodiment of the present invention.

FIG. 14 is a schematic diagram for illustrating an example of a map associating the engine load and a power correction coefficient with each other in the second embodiment of the present invention. The map illustrated in FIG. 14 is stored in the memory in advance.

The combustion is liable to be unstable when the engine load is low, and higher supplied power is thus required when the engine load increases from the low load to a medium load than when the engine load increases from the medium load to a high load. Thus, the map illustrated in FIG. 14 is set so that the power correction coefficient increases in a proportional manner along a proportional line as the engine load increases when the engine load is in a medium or higher load region, whereas the power correction coefficient takes a value larger than a value along the proportional line when the engine load is in a low load region.

The power supply control section 61 calculates the power correction coefficient corresponding to the engine load detected by the engine load detection device 12 in accordance with the map illustrated in FIG. 14.

In this way, the power correction coefficients corresponding to each of the number of engine revolutions and the engine load increase in the proportional manner along the proportional lines as the intake air amount increases, whereas the power correction coefficient corresponding to the engine load takes a value larger than the value along the proportional line when the engine load is low.

In place of the engine revolution number detection device 11 and the engine load detection device 12, a flow rate sensor may be provided in the intake path 3 so as to calculate a power correction coefficient corresponding to a flow rate detected by the flow rate sensor. In this case, the power correction coefficient corresponding to the flow rate increases in a proportional manner along a proportional line as the flow rate increases, whereas the power correction coefficient is set to a value larger than the value along the proportional line when the flow rate is low.

Figure 15:
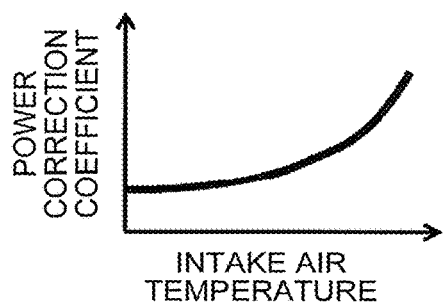
FIG. 15 is a schematic diagram for illustrating an example of a map associating an intake air temperature and a power correction coefficient with each other in the second embodiment of the present invention.

FIG. 15 is a schematic diagram for illustrating an example of a map associating the intake air temperature and a power correction coefficient with each other in the second embodiment of the present invention. The map illustrated in FIG. 15 is stored in the memory in advance.

As the intake air temperature increases, a lifetime of the combustion promoter decreases, and as a result, the generation efficiency of the combustion promoter decreases. Meanwhile, the lifetime thereof is not greatly influenced by the intake air temperature when the intake air temperature is in a vicinity of the ordinary temperature. Thus, the map illustrated in FIG. 15 is set so that the power correction coefficient increases along a downward-convex curve as the intake air temperature increases.

The power supply control section 61 calculates the power correction coefficient corresponding to the intake air temperature detected by the intake air state quantity detection device 9 in accordance with the map illustrated in FIG. 15.

Figure 16:
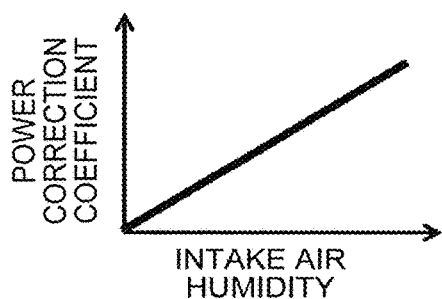
FIG. 16 is a schematic diagram for illustrating an example of a map associating an intake air humidity and a power correction coefficient with each other in the second embodiment of the present invention.

FIG. 16 is a schematic diagram for illustrating an example of a map associating the intake air humidity and a power correction coefficient with each other in the second embodiment of the present invention. The map illustrated in FIG. 16 is stored in the memory in advance.

Discharge energy generated by the combustion promoter generation device 5 is absorbed by the water molecules in the intake air, and the supplied power is thus required to be increased as the intake air humidity increases. Thus, the map illustrated in FIG. 16 is set so that the power correction coefficient increases in a proportional manner with respect to the increase in the intake air humidity.

The power supply control section 61 calculates the power correction coefficient corresponding to the intake air humidity detected by the intake air state quantity detection device 9 in accordance with the map illustrated in FIG. 16.

Figure 17:
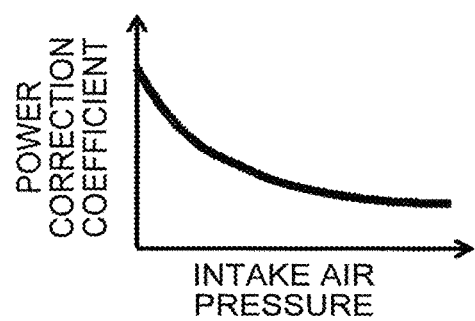
FIG. 17 is a schematic diagram for illustrating an example of a map associating an intake air pressure and a power correction coefficient with each other in the second embodiment of the present invention.

FIG. 17 is a schematic diagram for illustrating an example of a map associating the intake air pressure and a power correction coefficient with each other in the second embodiment of the present invention. The map illustrated in FIG. 17 is stored in the memory in advance.

In a region in which the intake air pressure is equal to or less than the atmospheric pressure, the generation efficiency of the combustion promoter increases as the intake air pressure increases. Thus, the map illustrated in FIG. 17 is set so that the power correction coefficient decreases along a downward-convex curve as the intake air pressure increases.

The power supply control section 61 calculates the power correction coefficient corresponding to the intake air pressure detected by the intake air state quantity detection device 9 in accordance with the map illustrated in FIG. 17.

Figure 18:
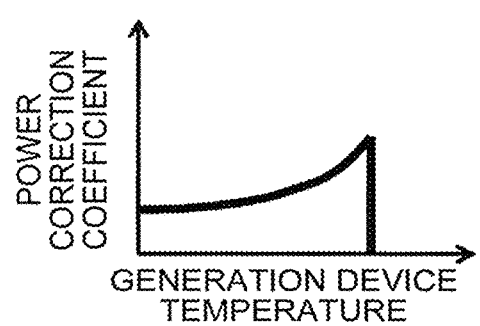
FIG. 18 is a schematic diagram for illustrating an example of a map associating a generation device temperature and a power correction coefficient with each other in the second embodiment of the present invention.

FIG. 18 is a schematic diagram for illustrating an example of a map associating the generation device temperature and a power correction coefficient with each other in the second embodiment of the present invention. The map illustrated in FIG. 18 is stored in the memory in advance.

As in the map illustrated in FIG. 15 described above, the map illustrated in FIG. 18 is set so that the power correction coefficient increases along a downward-convex curve as the generation device temperature increases. However, the generation device temperature exceeds the intake air temperature due to the heat of the discharge, and the generation device temperature may thus reach a temperature at which the combustion promoter cannot be generated. Thus, as illustrated in FIG. 18, the power correction coefficient is set to 0 at the temperature at which the combustion promoter cannot be generated.

With this configuration, the power supply can be stopped when the generation device temperature reaches the temperature at which the combustion promoter cannot be generated. As a result, a wasteful power can be decreased, and the combustion promoter generation device 5 can be brought into a cooled state by the intake air during the stop of the power supply.

The power supply control section 61 calculates the power correction coefficient corresponding to the generation device temperature detected by the generation-device-temperature detection device 10 in accordance with the map illustrated in FIG. 18.

The power supply control section 61 calculates the plurality of the power correction coefficients in accordance with the plurality of maps illustrated in FIG. 13 to FIG. 18 as described above, and then multiplies the supplied power corresponding to the engine output increasing rate by all the calculated power correction coefficients, to thereby correct the supplied power. There is no limitation of the order of the multiplications of the supplied power corresponding to the engine output increasing rate by the respective power correction coefficients.

In the second embodiment, the case of the configuration of using all the plurality of maps illustrated in FIG. 13 to FIG. 18 to correct the supplied power corresponding to the engine output increasing rate is exemplified, but at least one of the plurality of maps may be used to correct the supplied power. In this case, it is only required that the supplied power be corrected by multiplying the supplied power corresponding to the engine output increasing rate by the respective power correction coefficients calculated in accordance with the used maps.

Figure 19:
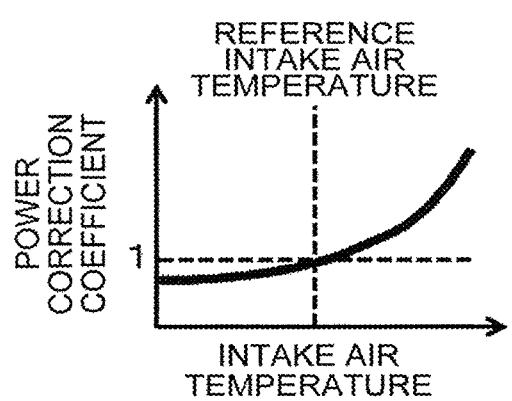
FIG. 19 is a schematic diagram for illustrating the power correction coefficient calculated in accordance with the map illustrated in FIG. 15.

Referring to FIG. 19, a further description is now given of the power correction coefficient. FIG. 19 is a schematic diagram for illustrating the power correction coefficient calculated in accordance with the map illustrated in FIG. 15.

A reference value at the time when the power correction coefficient is 1 is set in advance to each of the maps illustrated in FIG. 13 to FIG. 18. For example, as illustrated in FIG. 19, in the map associating the intake air temperature and the power correction coefficient with each other, an intake air temperature at the time when the power correction coefficient is 1 is set as a reference intake air temperature.

When the intake air temperature detected by the intake air state quantity detection device 9 is lower than the reference intake air temperature, the power correction coefficient takes a value of less than 1. In this case, the power supply control section 61 corrects the supplied power corresponding to the engine output increasing rate by multiplying the supplied power by the power correction coefficient of less than 1, and the supplied power after being corrected thus falls below the supplied power before being corrected.

Meanwhile, when the intake air temperature detected by the intake air state quantity detection device 9 is higher than the reference intake air temperature, the power correction coefficient takes a value of more than 1. In this case, the power supply control section 61 corrects the supplied power corresponding to the engine output increasing rate by multiplying the supplied power by the power correction coefficient of more than 1, and the supplied power after being corrected thus exceeds the supplied power before being corrected.

With such a configuration in which the supplied power corresponding to the engine output increasing rate is corrected through use of at least one of the plurality of maps illustrated in FIG. 13 to FIG. 18 in this way, the generated amount of the combustion promoter can appropriately be controlled. As a result, the instability of the combustion caused by the insufficient combustion promoter can be eliminated, and the consumed power can be saved.

As described above, the second embodiment is configured so that, in the configuration of the above-mentioned first embodiment, the supplied power corresponding to the engine output increasing rate is corrected in accordance with the detection values of the various parameters and the power supply device is controlled to supply the supplied power after being corrected.

With this configuration, it is possible to suppress generation of a state in which the density of the combustion promoter is insufficient even when the supplied power corresponding to the engine output increasing rate is supplied to the combustion promoter generation device. As a result, the instability of the combustion can be further suppressed.

Third Embodiment

In a third embodiment of the present invention, a description is given of a case in which a function of supplying the combustion promoter to the combustion chamber 2 in time with a timing at which the combustion becomes unstable is added to the configuration of the above-mentioned second embodiment. In the third embodiment, a description is omitted for the same points as those of the above-mentioned second embodiment, and a description is mainly given of differences from the above-mentioned second embodiment.

The above-mentioned first and second embodiments are configured to control the supplied power in accordance with the increase in the engine output command, whereas the first and second embodiments do not consider occurrence of a delay period from the generation of the combustion promoter until the supply to the combustion chamber 2 depending on conditions. Thus, the third embodiment is configured so that a power supply timing is determined in consideration of the delay period, and the power is supplied to the combustion promoter generation device 5 in time with the power supply timing.

Figure 20:
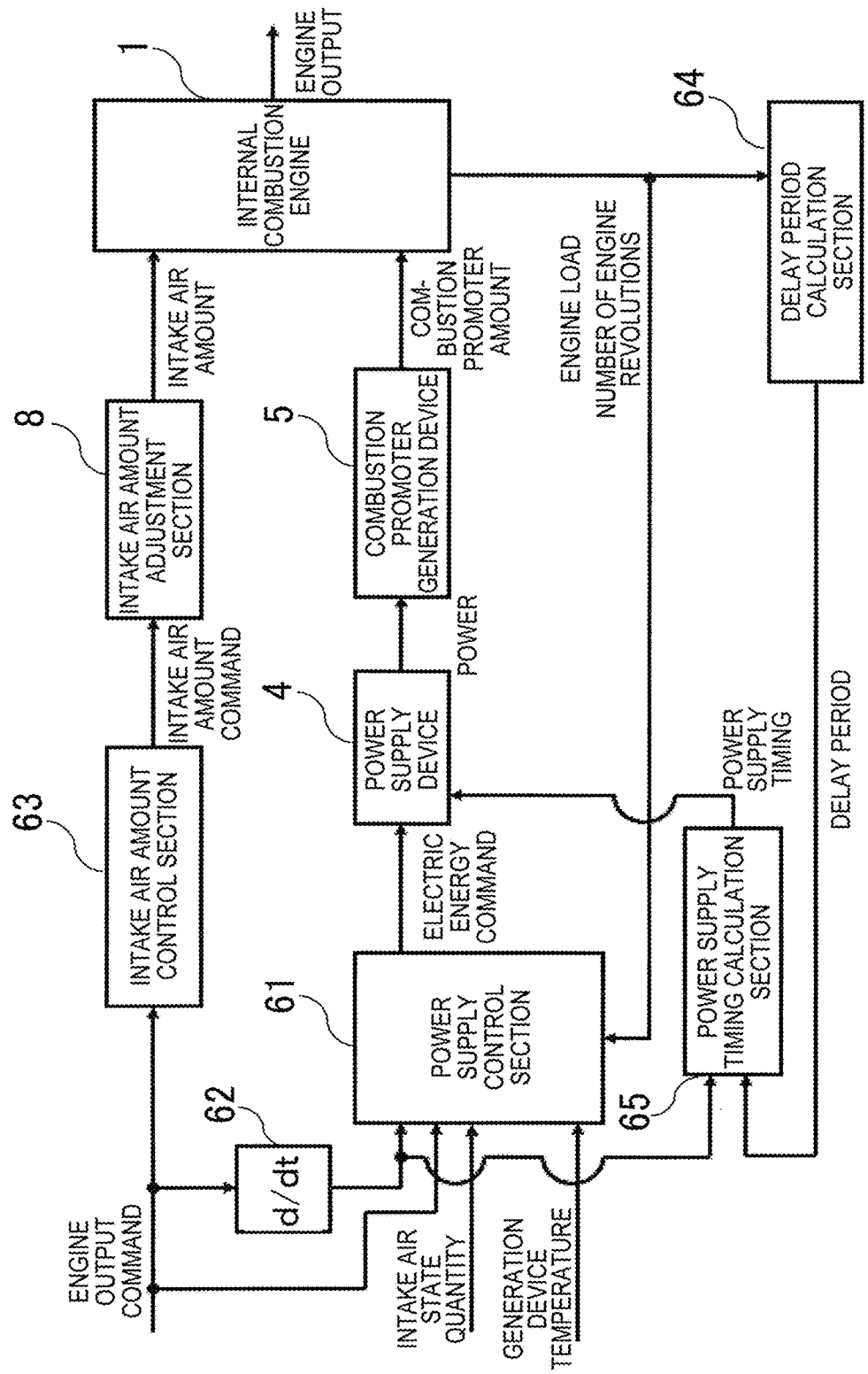
FIG. 20 is a block diagram for illustrating an example of a combustion stabilization device for an internal combustion engine according to a third embodiment of the present invention.

FIG. 20 is a block diagram for illustrating an example of a combustion stabilization device for an internal combustion engine according to the third embodiment of the present invention. In FIG. 20, the combustion stabilization device further includes a delay period calculation section 64 and a power supply timing calculation section 65, which are included in the electronic control unit 6, in addition to the configuration of FIG. 12 described above. An electronic control unit independent of the electronic control unit 6 may include the delay period calculation section 64 and the power supply timing calculation section 65 depending on performance of calculation processing of the electronic control unit 6.

The delay period calculation section 64 calculates the period until the combustion promoter generated from the combustion promoter generation device 5 is supplied to the combustion chamber 2 as the delay period. A transition period of the intake air speed or a combustion state is determined by the number of engine revolutions in a proportional manner. Thus, the delay period calculation section 64 calculates the delay period with use of the number of combustion cycles corresponding to the number of engine revolutions as a unit.

For example, when a case in which the number of engine revolutions is 3,000 rpm and a case in which the number of engine revolutions is 1,000 rpm are compared with each other for a period of one second, the case in which the number of engine revolutions is 3,000 rpm has a greater influence. Thus, in the third embodiment, the delay period is more appropriately expressed as the number of combustion cycles.

The delay period calculation section 64 calculates the delay period by dividing an amount Mg of air existing in the intake path 3 from the combustion promoter generation device 5 to the combustion chamber 2 by an amount Mc of air used in one cycle of the combustion cycle.

The air amount Mg is known, and is obtained in advance from a volume of the intake path 3 from the combustion promoter generation device 5 to the combustion chamber 2. The volume of the intake path 3 from the combustion promoter generation device 5 to the combustion chamber 2 is known, and the volume is only required to be measured when the combustion promoter generation device 5 is provided in the intake path 3, for example. The delay period calculation section 64 may be configured to correct the known air amount Mg based on respective pressures on an upstream side and a downstream side of the intake air amount adjustment device 8. In this case, the pressure on the upstream side may be set as the atmospheric pressure, and the pressure on the downstream side may be set as the intake air pressure detected by the intake air state quantity detection device 9.

The air amount Mc is calculated by the delay period calculation section 64. The delay period calculation section 64 calculates the air amount Mc from the intake air pressure detected by the intake air state quantity detection device 9 and a known stroke volume of the internal combustion engine 1. The delay period calculation section 64 may be configured to detect a cylinder pressure of the internal combustion engine 1, and use the cylinder pressure in place of the intake air pressure to calculate the air amount Mc.

In this way, the delay period calculation section 64 can calculate the number of cycles required in the course from the generation of the combustion promoter to the supply of the combustion promoter to the combustion chamber 2 as the delay period by dividing the air amount Mg by the air amount Mc.

The power supply timing calculation section 65 calculates the power supply timing based on the delay period calculated by the delay period calculation section 64 and the engine output increasing rate calculated by the engine output increasing rate calculation section 62. Specifically, the power supply timing calculation section 65 determines the power supply timing so that a timing at which the engine output starts to increase and a timing at which the supply of the combustion promoter generated from the combustion promoter generation device 5 to the combustion chamber 2 is started match each other.

The power supply control section 61 carries out control so that the power is supplied to the combustion promoter generation device 5 in time with the power supply timing calculated by the power supply timing calculation section 65.

Figure 21:
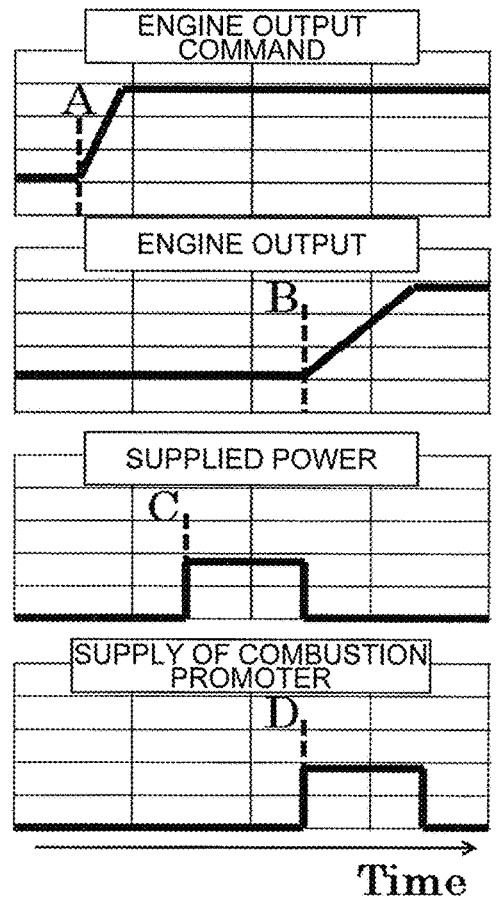
FIG. 21 is a timing chart for illustrating an example of a power supply timing calculated by a power supply timing calculation section in the third embodiment of the present invention.

FIG. 21 is a timing chart for illustrating an example of the power supply timing calculated by the power supply timing calculation section 65 in the third embodiment of the present invention. In FIG. 21, the respective vertical axes indicate a relative value of the engine output command value, a relative value of the engine output, a relative value of the supplied power, and a relative value of the amount of the combustion promoter, and the horizontal axes are each a common time axis.

In FIG. 21, a timing A at which the engine output command starts to increase, a timing B at which the engine output starts to increase, a timing C at which the supply of the supplied power is started, namely, the power supply timing, and a timing D at which the supply of the combustion promoter to the combustion chamber 2 is started are illustrated along the horizontal axis.

The power supply timing calculation section 65 obtains a period (hereinafter referred to as period AC) between the timing A and the timing C, and uses the period AC to match the timing B and the timing D with each other.

A period (hereinafter referred to as period CD) between the timing C and the timing D corresponds to the delay period calculated by the delay period calculation section 64, and is thus known.

Moreover, a period (hereinafter referred to as period AB) between the timing A and the timing B varies depending on characteristics of the internal combustion engine 1. Thus, a relationship between the engine output increasing rate and the period AB is examined in advance, and a map associating the engine output increasing rate and the period AB with each other is stored in the memory. The power supply timing calculation section 65 calculates the period AB corresponding to the engine output increasing rate calculated by the engine output increasing rate calculation section 62 in accordance with the map.

The power supply timing calculation section 65 is capable of calculating the period AC from a difference between the period AB and the period CD and using the calculation result to obtain the power supply timing so that the timing B and the timing D match with each other.

For example, as the intake air pressure decreases, and the period CD increases, the period AC calculated by the power supply timing calculation section 65 decreases. In other words, the power supply control section 61 controls the power supply device 4 so that the power is supplied earlier as the delay period calculated by the delay period calculation section 64 increases.

Moreover, for example, as the engine output increasing rate increases, the period AB decreases, and the period AC calculated by the power supply timing calculation section 65 decreases. In other words, the power supply control section 61 controls the power supply device 4 so that the power is supplied earlier as the engine output increasing rate calculated by the engine output increasing rate calculation section 62 increases.

As described above, the third embodiment is configured to determine the power supply timing in consideration of the delay period, and control the power control device so that the power is supplied to the combustion promoter generation device in time with the power supply timing in each of the configurations of the above-mentioned first and second embodiments. As a result, it is possible to implement appropriate control in which the delay period from the generation of the combustion promoter until the supply to the combustion chamber is taken into consideration.

Fourth Embodiment

In a fourth embodiment of the present invention, a description is given of a case in which each of the combustion stabilization devices of the above-mentioned first to third embodiments is applied to a multi-cylinder internal combustion engine including a plurality of cylinders. In the fourth embodiment, a description is omitted for the same points as those of the above-mentioned first to third embodiments, and a description is mainly given of differences from the above-mentioned first to third embodiments.

Each of the respective combustion stabilization devices according to the above-mentioned first to third embodiments can be applied to both a single-cylinder internal combustion engine and a multi-cylinder internal combustion engine. Moreover, when each of the combustion stabilization devices is applied to a multi-cylinder internal combustion engine, a configuration in which the combustion promoter generation device 5 is provided in the intake path 3 branching to each of the cylinders can be employed.

Figure 22:
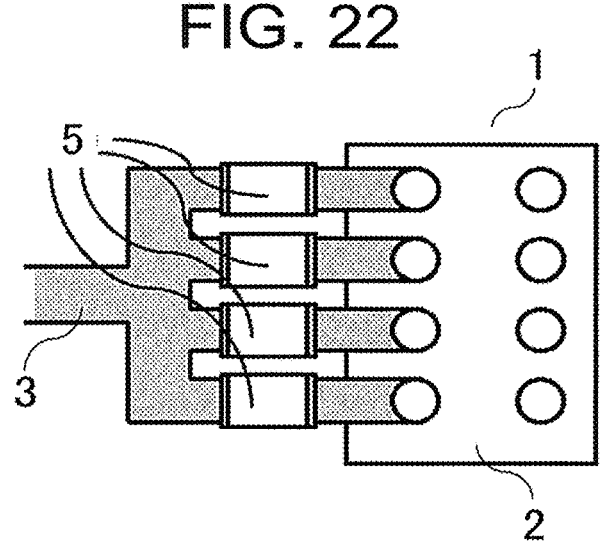
FIG. 22 is a schematic diagram for illustrating an example of the combustion stabilization device for an internal combustion engine according to a fourth embodiment of the present invention.

FIG. 22 is a schematic diagram for illustrating an example of the combustion stabilization device for an internal combustion engine according to the fourth embodiment of the present invention. In FIG. 22, the intake path 3 branches to the respective four cylinders of the internal combustion engine 1. Moreover, the combustion promoter generation device 5 is provided in the intake path 3 to each of the cylinders.

With this configuration, the combustion promoter generation devices 5 can be provided closer toward the combustion chamber 2 side, and the period CD illustrated in FIG. 16 described above can thus be decreased. Moreover, not only the responsiveness is increased, but also an amount of the generated combustion promoter decomposed until being supplied to the combustion chamber 2 decreases, and the power consumption can thus be decreased.

The pulsation of the pressure due to the air intake to each of the cylinders is significant on a downstream side of a branch point at which the intake path 3 branches. Thus, the pressure in the discharge environment can appropriately be selected for each of the cylinders by controlling a discharge timing of the combustion promoter generation device 5 so that the timing at which the combustion promoter is generated is different from cylinder to cylinder.

For example, when a timing at which the pressure in the discharge environment is low is selected as the discharge timing, the voltage required for the discharge can be decreased. Meanwhile, when a timing at which the pressure in the discharge environment is high is selected as the discharge timing, the generation efficiency of the combustion promoter can be increased.

As described above, the fourth embodiment is configured so that the combustion promoter generation device is provided in the intake path to each of the plurality of cylinders of the internal combustion engine in each of the configurations of the above-mentioned first to third embodiments. As a result, the combustion promoter generation devices can be provided closer toward the combustion chamber side.

A description is individually given of each of the first to fourth embodiments, but the respective configuration examples disclosed in the first to fourth embodiments can freely be combined with one another.

The invention claimed is:

1. A combustion stabilization device for an internal combustion engine, comprising:
a power supply device, which is configured to supply power;
a combustion promoter generation device, which is configured to generate a combustion promoter through the power supplied from the power supply device to supply the combustion promoter to a combustion chamber of an internal combustion engine, a generation amount of the combustion promoter increasing as the supplied power increases;
an engine output command device, which is configured to output an engine output command for controlling engine output of the internal combustion engine; and
processing circuitry configured to
control the power supply device,
calculate a change amount per unit time of the engine output command output by the engine output command device as an engine output increasing rate;
control the power supply device so that the power corresponding to the engine output increasing rate calculated is supplied, to thereby adjust the generation amount of the combustion promoter;

divide an amount of air existing in an intake path from the combustion promoter generation device to the combustion chamber by an amount of air used in one cycle of a combustion cycle, to thereby calculate a delay period until the combustion promoter generated from the combustion promoter generation device is supplied to the combustion chamber; and calculate a power supply timing at which supply of the power is to be started based on the delay period calculated and the engine output increasing rate calculated so that a timing at which an increase in the engine output starts and a timing at which the combustion promoter generated from the combustion promoter generation device is supplied to the combustion chamber match each other, and wherein the processing circuitry is configured to control the power supply device so that the power is supplied in time with the power supply timing calculated.

2. A combustion stabilization device for an internal combustion engine according to claim 1, wherein the processing circuitry is configured to control the power supply device so that the power is supplied earlier as the delay period calculated increases.

3. A combustion stabilization device for an internal combustion engine according to claim 1, wherein the processing circuitry is configured to control the power supply device so that the power is supplied earlier as the engine output increasing rate calculated increases.

4. A combustion stabilization device for an internal combustion engine according to any one of claim 1, further comprising an intake air state quantity detection device, which is configured to detect at least one of an intake air temperature of the internal combustion engine, an intake air humidity of the internal combustion engine, or an intake air pressure of the internal combustion engine as an intake air state quantity, wherein the processing circuitry is configured to correct the supplied power corresponding to the engine output increasing rate calculated in accordance with the intake air state quantity detected by the intake air state quantity detection device, and to control the power supply device so that the corrected power is supplied.

5. A combustion stabilization device for an internal combustion engine according to claim 1, further comprising an engine load detection device, which is configured to detect an engine load of the internal combustion engine, wherein the processing circuitry is configured to correct the supplied power corresponding to the engine output increasing rate calculated in accordance with the engine load detected by the engine load detection device, and to control the power supply device so that the corrected power is supplied.

6. A combustion stabilization device for an internal combustion engine according to claim 1, further comprising an engine revolution number detection device, which is configured to detect a number of engine revolutions of the internal combustion engine, wherein the processing circuitry is configured to correct the supplied power corresponding to the engine output increasing rate calculated in accordance with the number of engine revolutions detected by the engine revolution number detection device, and to control the power supply device so that the corrected power is supplied.

7. A combustion stabilization device for an internal combustion engine according to claim 1, further comprising a generation-device-temperature detection device, which is configured to detect a device temperature of the combustion promoter generation device, wherein the processing circuitry is configured to correct the supplied power corresponding to the engine output increasing rate calculated in accordance with the device temperature detected by the generation-device-temperature detection device, and to control the power supply device so that the corrected power is supplied.

* * * * *